(12) United States Patent
Blackwell et al.

(10) Patent No.: US 10,878,431 B2
(45) Date of Patent: *Dec. 29, 2020

(54) SYSTEM AND METHOD FOR PROVIDING PREVIEW RESULTS FOR SEARCH SYSTEMS INTEGRATING MULTIPLE COLLECTIONS

(71) Applicant: INTERNATIONAL BUSINESS MACHINES CORPORATION, Armonk, NY (US)

(72) Inventors: Jason M. Blackwell, Vestal, NY (US); Robert B. Desaulniers, Superior, CO (US); Seenivasagam Dhamotharakkannan, Ellicott City, MD (US); Annie Fleming, Glen Aubrey, NY (US); Brian C. Meyer, Louisville, CO (US); Douglas Spadotto, Sao Paulo (BZ)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 391 days.

This patent is subject to a terminal disclaimer.

(21) Appl. No.: 15/903,863

(22) Filed: Feb. 23, 2018

(65) Prior Publication Data
US 2018/0181970 A1    Jun. 28, 2018

Related U.S. Application Data

(63) Continuation of application No. 11/833,078, filed on Aug. 2, 2007, now Pat. No. 9,953,329.

(51) Int. Cl.
*G06F 16/951* (2019.01)
*G06Q 30/02* (2012.01)

(52) U.S. Cl.
CPC .......... *G06Q 30/02* (2013.01); *G06F 16/951* (2019.01)

(58) Field of Classification Search
CPC ........ G06Q 10/00; G06Q 30/00; G06Q 30/02; G06F 16/951
See application file for complete search history.

(56) References Cited

U.S. PATENT DOCUMENTS 6,370,527 B1  4/2002 Singhal
6,711,565 B1  3/2004 Subramaniam et al.
(Continued)

OTHER PUBLICATIONS

Susan Dziadosz et al., "Do Thumbnail Previews Help Users Make Better Relevance Decisions about Web Search Results?", SIGIR 2002, Aug. 11-15, 2002, pp. 365-366.
(Continued)

*Primary Examiner* — Shew Fen Lin
(74) *Attorney, Agent, or Firm* — Brian Restauro; Andrew M. Calderon; Roberts Calderon Safran & Cole, P.C.

(57) ABSTRACT

A system and method for providing previews of search results and, more particularly, to a system and method for providing preview results for search systems integrating multiple collections. The method includes providing search results associated with a first collection based on at least one search term and providing a customizable preview of search results for the at least one search term. The customizable preview of search results is associated with at least a second collection different from the first collection.

14 Claims, 18 Drawing Sheets

(56) References Cited

U.S. PATENT DOCUMENTS

| | | | |
|---|---|---|---|
| 6,785,671 B1 * | 8/2004 | Bailey | G06Q 10/02 705/5 |
| 6,807,539 B2 | 10/2004 | Miller et al. | |
| 7,047,502 B2 | 5/2006 | Petropoulos et al. | |
| 7,555,476 B2 | 6/2009 | Holbrook | |
| 7,617,203 B2 * | 11/2009 | Awadallah | G06Q 30/02 |
| 7,664,770 B2 * | 2/2010 | Jackson | G06F 16/951 707/706 |
| 7,669,142 B2 * | 2/2010 | Ray | G06F 16/9577 715/825 |
| 7,873,622 B1 * | 1/2011 | Karls | G06F 16/951 707/707 |
| 8,037,060 B1 * | 10/2011 | Wang | G06F 16/951 707/722 |
| 9,953,329 B2 * | 4/2018 | Blackwell | G06F 16/951 |
| 2002/0120779 A1 | 8/2002 | Teeple et al. | |
| 2004/0078224 A1 | 4/2004 | Schramm-Apple et al. | |
| 2004/0167933 A1 | 8/2004 | Lomelin-Stoupignan et al. | |
| 2005/0004889 A1 * | 1/2005 | Bailey | G06Q 30/02 |
| 2005/0004911 A1 | 1/2005 | Goldberg et al. | |
| 2005/0160082 A1 * | 7/2005 | Dawson | G06F 16/335 |
| 2005/0204276 A1 * | 9/2005 | Hosea | H04L 67/306 715/205 |
| 2005/0228788 A1 | 10/2005 | Dahn et al. | |
| 2005/0278321 A1 * | 12/2005 | Vailaya | G06F 16/951 |
| 2006/0095424 A1 | 5/2006 | Petropoulos et al. | |
| 2006/0106793 A1 | 5/2006 | Liang | |
| 2007/0157118 A1 * | 7/2007 | Wuttke | G06F 16/957 715/810 |
| 2007/0198500 A1 | 8/2007 | Lucovsky | |
| 2008/0027914 A1 * | 1/2008 | Caputo | G06F 16/9562 |
| 2008/0154858 A1 | 6/2008 | Manavoglu et al. | |
| 2008/0201304 A1 * | 8/2008 | Sue | G06F 16/338 |
| 2008/0215504 A1 | 9/2008 | Issen et al. | |
| 2008/0270932 A1 | 10/2008 | Diaz et al. | |
| 2008/0313147 A1 * | 12/2008 | Svore | G06F 16/3331 |
| 2009/0037375 A1 * | 2/2009 | Won Cho | G06Q 30/02 |
| 2009/0037406 A1 * | 2/2009 | Blackwell | G06F 16/951 |
| 2009/0044133 A1 | 2/2009 | Goto | |

OTHER PUBLICATIONS

Tim Paek et al., "WaveLens: A New View onto Internet Search Results", CHI 2004, Apr. 24-29, Vienna Austria, vol. 6, No. 1, pp. 727-734.

Hoeber O et al., "Visualization Support for Interactive Query Refinement", Proceedings. The 2005 IEEE/WIC/ACM International Conference on Web Intelligence, pp. 657-665, Published; Los Alamitos, CA, USA, 2005 (Abstract).

Danny Sullivan, "Google 2.0: Google Universal Search", May 16, 2007 at 2:33 pm Eastern, htt12://searchengineland.com/070516-143312.12h12, pp. 1-18.

* cited by examiner

SYSTEM AND METHOD FOR PROVIDING PREVIEW RESULTS FOR SEARCH SYSTEMS INTEGRATING MULTIPLE COLLECTIONS

FIELD OF THE INVENTION

The invention generally relates to a system and method for providing previews of search results and, more particularly, to a system and method for providing previews of search results for search systems integrating multiple collections.

BACKGROUND OF THE INVENTION

A search engine is an information retrieval system designed to find information stored on a computer system, such as on the World Wide Web or inside a corporate or proprietary network. The search engine allows a user to search for content meeting specific criteria (e.g., typically containing a given word or phrase) and retrieves a list of items that match the criteria. This list is often sorted with respect to some measure of relevance of the results.

Major search engines rarely focus on a single data type, though. For example, Internet search engines offer searches for Web pages, as well as the ability to search for images, groups, news, shopping, videos, people, and many other categories. These different categories of information are referred to as "collections." Frequently, the control offered to the user to specify what collection to search is a listing of links or tabs provided near the text field for entering text searchable words.

By providing the ability to search a host of collections, the user is empowered to locate a greater body of information from a single site. However, the common implementation selecting which collection to search has its shortcomings. For example, at times, the user may forget what collection they are currently searching, and fail to find the target materials, as they are stored in another collection. Illustratively, it is not uncommon that a user wanting to find an article struggles with the task because the user was searching a "book" collection rather than an "article" collection. Other times, the user might believe which collection to search, but the answer is stored in another collection.

Also, when seeking an abstract piece of information, it may not be evident which collection the user needs to search. For example, a user may want to know the status of a tax law that was being debated by the U.S. Congress. The user might search the World Wide Web and find a page on tax law that has not been updated and, as such, the user may wrongly conclude that the law had not passed. Yet, if the user searched "Video" or "Audio" collections, the user may have found a broadcast that indicates the law did pass, or if they had searched the "News" collection they may have found an article describing the passing of the law.

Search engines have been grappling with such problems for a long time. One solution proposed is to allow the user to select searchable collections in order to obtain a full listing of all results for each collection. However, there is pressure on the user to decide what collection(s) they need to search. Furthermore, this can lead to the opposite problem: an overload of results that the critical result gets lost in the voluminous search results.

Another solution is to provide reminders to the user in the search results area. This solution does provide the user with a reminder that the information they need may be found in one of the collections not searched. But there are a number of limitations/problems with this solution. For example, the system is almost behaving as if the results from the other collection are more important than the collection the user opted to search. That is, the user's primary search results are pushed down in favor of supplying results from a collection the user did not specifically search (e.g., News).

Accordingly, there exists a need in the art to overcome the deficiencies and limitations described hereinabove.

SUMMARY OF THE INVENTION

In a first aspect of the invention, a method comprises providing search results associated with a first collection based on at least one search term, and providing a customizable preview of search results for the at least one search term. The customizable preview of search results is associated with at least a second collection different from the first collection.

In a second aspect of the invention, the method comprises providing a preview of search results. The method comprises providing a computer infrastructure operable to: obtain a full listing of search results for a searchable collection; display the full listing of the search results; obtain a preview listing of search results for at least one different searchable collection; and display the preview listing of the search results on a portion of a same display as the full listing of the search results.

In another aspect of the invention, a system has a hardware component and/or a software component. The hardware component and/or the software component are operable to provide a listing of search results for a first requested collection and a customizable preview listing of search results for at least a second requested collection. The preview listing is a subset of a full listing of search results for the second requested collection.

In yet another aspect of the invention, a computer infrastructure has a computer readable medium having a computer program executable to provide: search results associated with a first collection based on at least one search term; and a customizable preview of search results for the search term. The customizable preview of the search results is associated with at least a second collection different from the first collection.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

Figure 1:
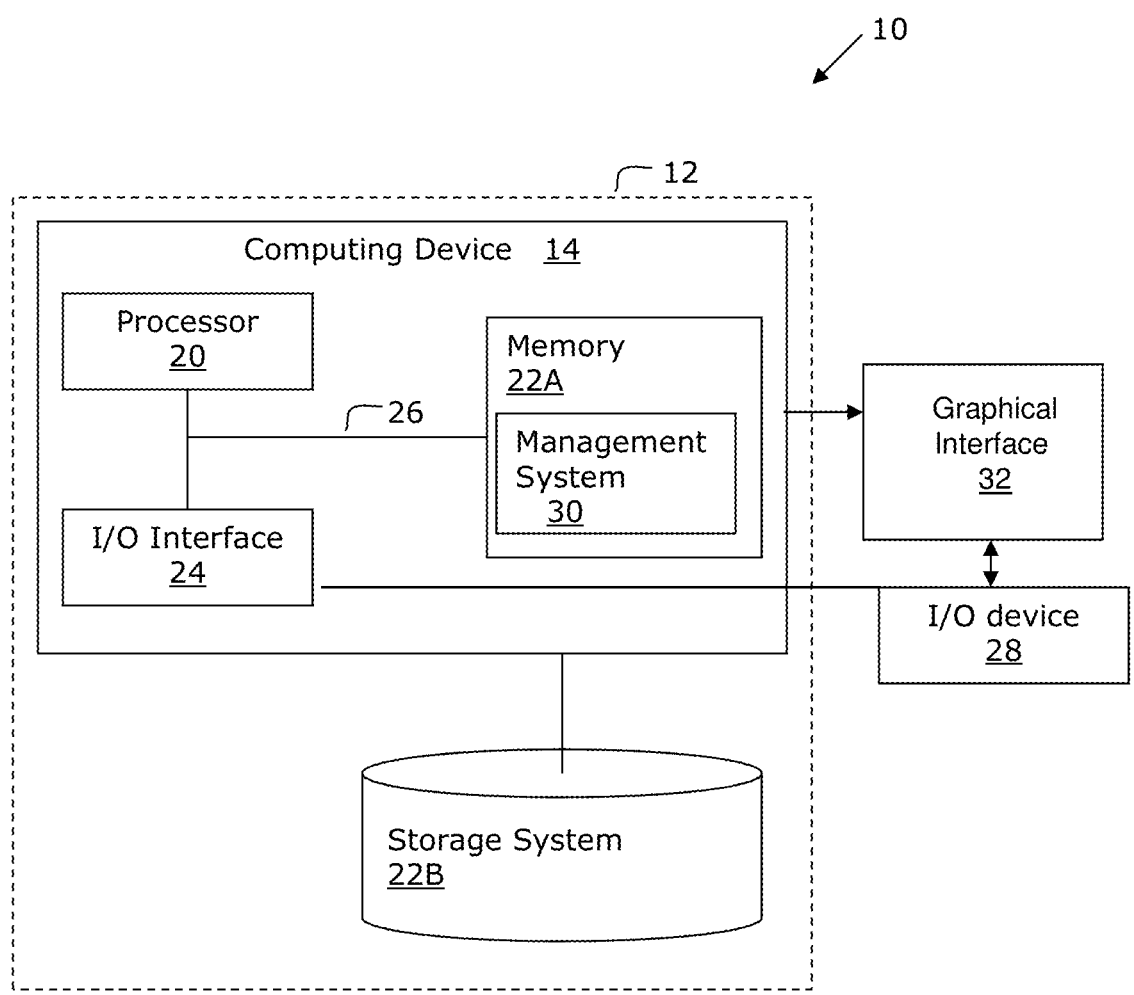
FIG. 1 shows an illustrative environment for implementing the processes in accordance with the invention.

The invention generally relates to a system and method for providing a preview of search results and, more particularly, to a system and method for providing a list of preview search results for systems integrating multiple collections. By using the system and method of the invention it is possible to provide a preview of search results across collections with a single search. The present invention also eliminates any pressure on the user to decide what collection to search, while also not interrupting the user during a review of the search results for the search they deliberately performed. Additionally, it is now possible for the user to target collections of interest during the search, which can be customized to a user's preference. The invention can be used over any distributed network, for example, as discussed in more detail below.

Overview of the Invention

The system and method of the invention provides enhancements to known search engines and their capabilities. In one embodiment, the user may select a main collection to search. The user may then select any number of options for previewing search results in other, secondary collections. By way of example, the user may select a main collection of "Blogs" and secondary collections "News", "Images", and "Videos". As a further option, the user may select a number of results for each secondary collection to be viewed, e.g., three search results for each selected collection, an order of the secondary collections, etc. As further discussed below, the user can customize the preview in numerous other ways. The user can then begin a search by providing a search term in the required search field.

Once the search term is entered, the search engine, in a conventional manner, will search the main collection and the other secondary selected collections. Once the search is completed, the search results associated with the main selected collection will be displayed on a main portion of the display. Concurrently, a customizable preview of search results or a list thereof will be displayed on the display for the same search. The customizable preview search will provide search results for the other secondary selected collections, which is different than the main selected collection.

The customizable preview is a subset of a search result for the other secondary selected collections. In embodiments, the customizable preview search result is expandable to a full search result for the other selected collections. This expansion may be accomplished by simply selecting a hyperlink or icon, button, etc., associated with any of the other selected collections. Similarly, each of the search results in the selected collections may be expanded, e.g., opened, in order to view the search result, contracted or completely eliminated. The former option may be accomplished by selecting an appropriate hyperlink to view the search result. It should be understood that the other selected collections could be two or more collections each of which are defined and/or customizable by the user. The requested collections can be predefined collections on an existing search engine searching for results on the World Wide Web.

Accordingly, the system and method of the invention provides the following advantages, amongst others:

The previews provide reminders that there are other collections available for searching. The previews are also a subtle reminder on which collection the user did search, reducing the chance that the user will fail because they are searching the wrong collection.

The previews provide users some results from other collections, which may eliminate the need to actively search the other collections. That is, the user may obtain the other collection result they need, and are essentially performing multi-collection searches without taking special action.

The previews are placed such that they are a minimal distraction to users who want to focus on their primary search (e.g., the preview sections could be placed on the left for countries where users most often read from right to left or vice versa).

The previews are under the user's control, rather than under system control. Users who do not want the previews at all can remove them. Users with special interests can choose which previews appear, and in a specific order.

The previews may be provided by a service provider on a fee or subscription basis. By example, the service provider may obtain advertisement fees for the services provided. The service provider may support, maintain, deploy and/or create an infrastructure to perform the above processes.

System Environment

FIG. 1 shows an illustrative environment 10 for managing the processes in accordance with the invention. The environment 10 includes a computer infrastructure 12 that can perform the processes described herein. In particular, the computer infrastructure 12 includes a computing device 14 that comprises a management system 30. The management system 30 makes computing device 14 operable to allow users to obtain preview search results (e.g., list of preview results) for any number of collections, in conjunction with search results for a main collection selected by the user.

The obtained collections for the preview list (also referred to as previews) can be selected by the user and can include numerous types of customizable options. By way of example, the options may include any number of existing collections to search (already defined in a search engine, searching the World Wide Web), as well as custom searches, number of search results for each collection, etc. The search results and previews may be provided or displayed on the same user interface, with hyperlinks to each of the collections selected in the preview list. In this manner, management system 30 enhances known search engines, allowing the existing search engines to provide results of many different collections, some of which will be provided in the preview list.

The computing device 14 includes a processor 20, a memory 22A, an input/output (I/O) interface 24, a bus 26 and a user interface 32. The user interface 32 enables the user to search, locate, open and read any of the search results in the preview list, as well as the main search collection. In embodiments, user interface 32 will display the preview list in the same display as the main search results, and can even include a visual cue of the preview list. The visual cue may be, for example, a highlighted section of the display, different font types, etc., to name some examples.

The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

The processor 20 executes computer program code, which is stored in memory 22A and/or storage system 22B. While executing computer program code, processor 20 can read and/or write data to/from memory 22A, storage system 22B, and/or I/O interface 24. The computer program code is configured to execute the processes described herein. The bus 26 provides a communications link between each of the components in computing device 14. The I/O device 28 can comprise any device that enables an individual to interact with computing device 14 and/or any device that enables computing device 14 to communicate with one or more other computing devices using any type of communications link. Thus, computing device 14 shown in FIG. 1 may be provided on any distributed network.

The computing device 14 can comprise any general purpose-computing article of manufacture capable of executing computer program code installed thereon (e.g., a personal computer, server, handheld device, etc.). For the purposes of this description, the article of manufacture can be a computer-usable or computer readable medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

It is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in embodiments, computer infrastructure 12 comprises two or more computing devices (e.g., a server cluster) that communicate over any type of communications link, such as a network, a shared memory, or the like, to perform the process described herein. Further, while performing the processes described herein, one or more computing devices in computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the processes of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Illustrative Embodiments of the Invention

Figure 2A:
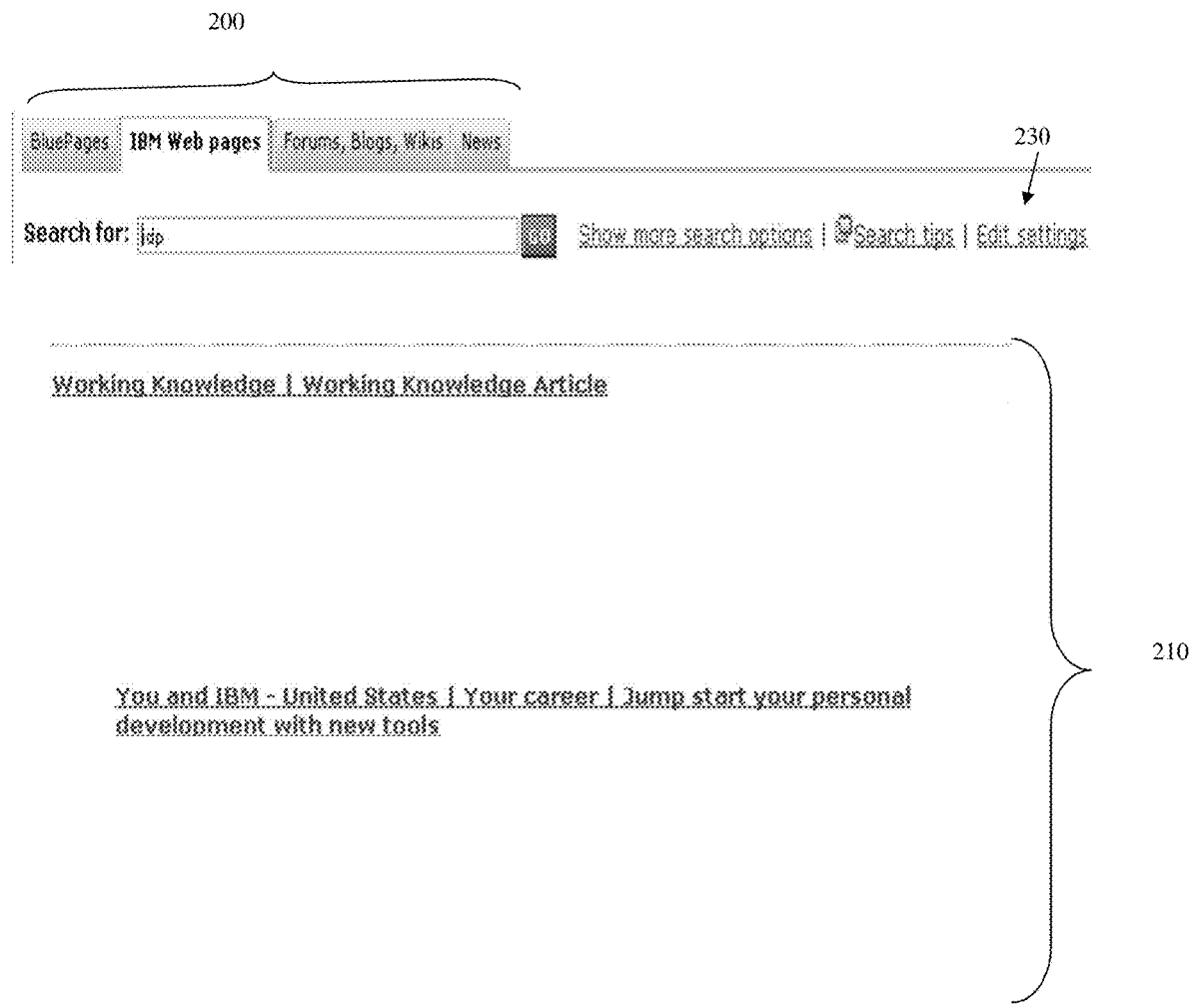
FIGS. 2a-2c are exemplary graphical interfaces showing the processes for implementing aspects of the invention.
Figure 2B:
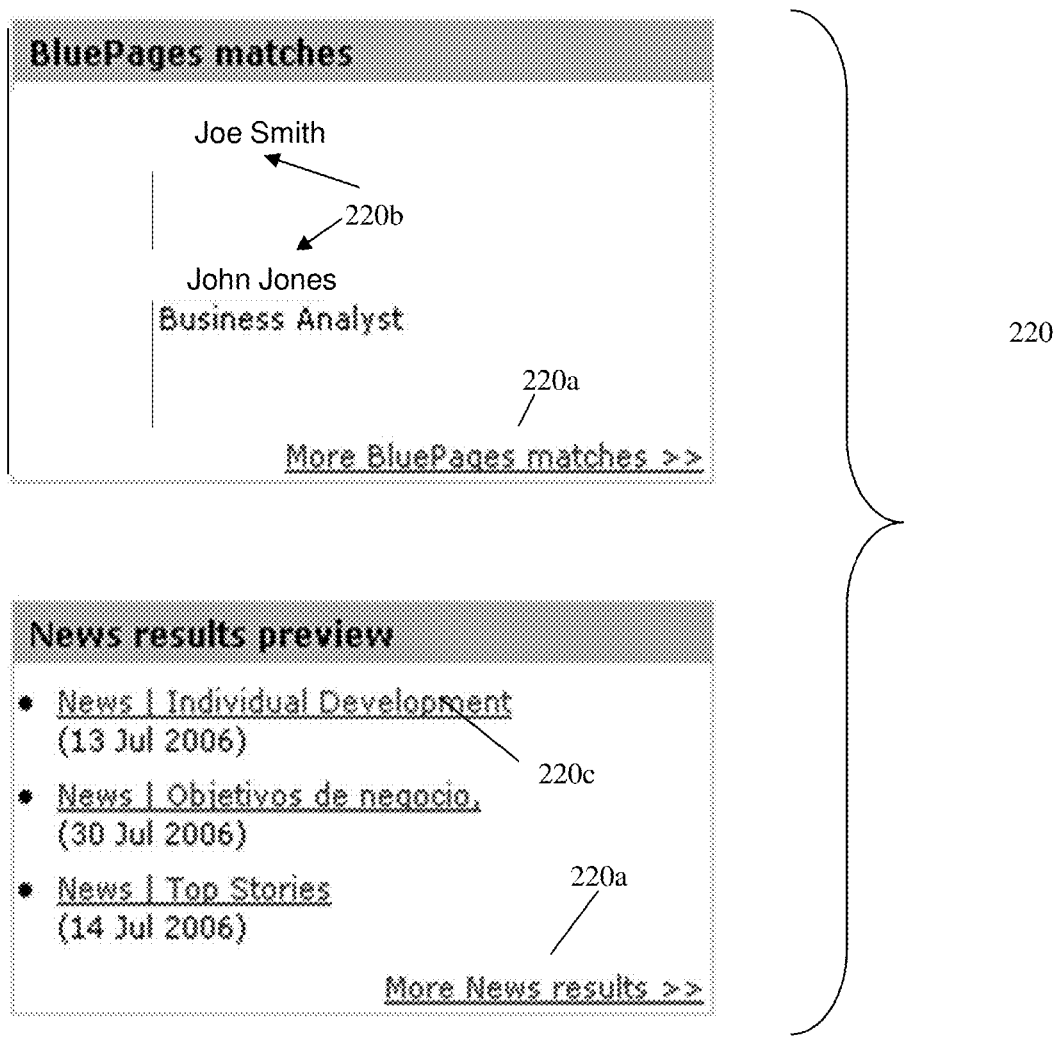

FIGS. 2a and 2b show displays according to one aspect of the invention. More specifically, FIG. 2a shows the IBM® w3™ Search Engine, with a main search result. (IBM is a registered trademark of International Business Machines Corp. in the United States, other countries, or both. w3 is a trademark of IBM.) It should be understood though that the system and method of the present invention may be integrated into any known search engine display and, as such, FIG. 2a may be representative of any search engine display. In this interface, the search engine includes the ability to search different collections, represented by tabs 200 (e.g., BluePages™, IBM Web pages, Forums/Blogs/Wikis, and News). (Bluepages is a trademark of International Business Machines.) In the present illustrative example, the user has selected to search "IBM Web pages" for items related to "idp". As shown, the central search area shows IBM Web page results 210.

As shown in FIG. 2b, a sidebar displays other secondary collections (e.g., BluePages and News) as a preview list 220, with a link 220a to access the full results from each collection. In this illustrative example, the link 220a allows the user to navigate to a search result screen providing all results for the respective collection. In this manner, the user is provided with top-level results from the other collections from a single search, without pushing down the search results for the collection that was deliberately searched.

In the example of FIG. 2b, BluePages is an employee directory, which displays the name of an employee as a link 220b, with the user's job role and picture. Similarly, the "News" results preview shows an article title as link 220c with the date of publication as a description. It should be understood by those of skill in the art that other information may also be provided with the search results, and that FIG. 2b shows only one illustrative example.

Figure 2C:
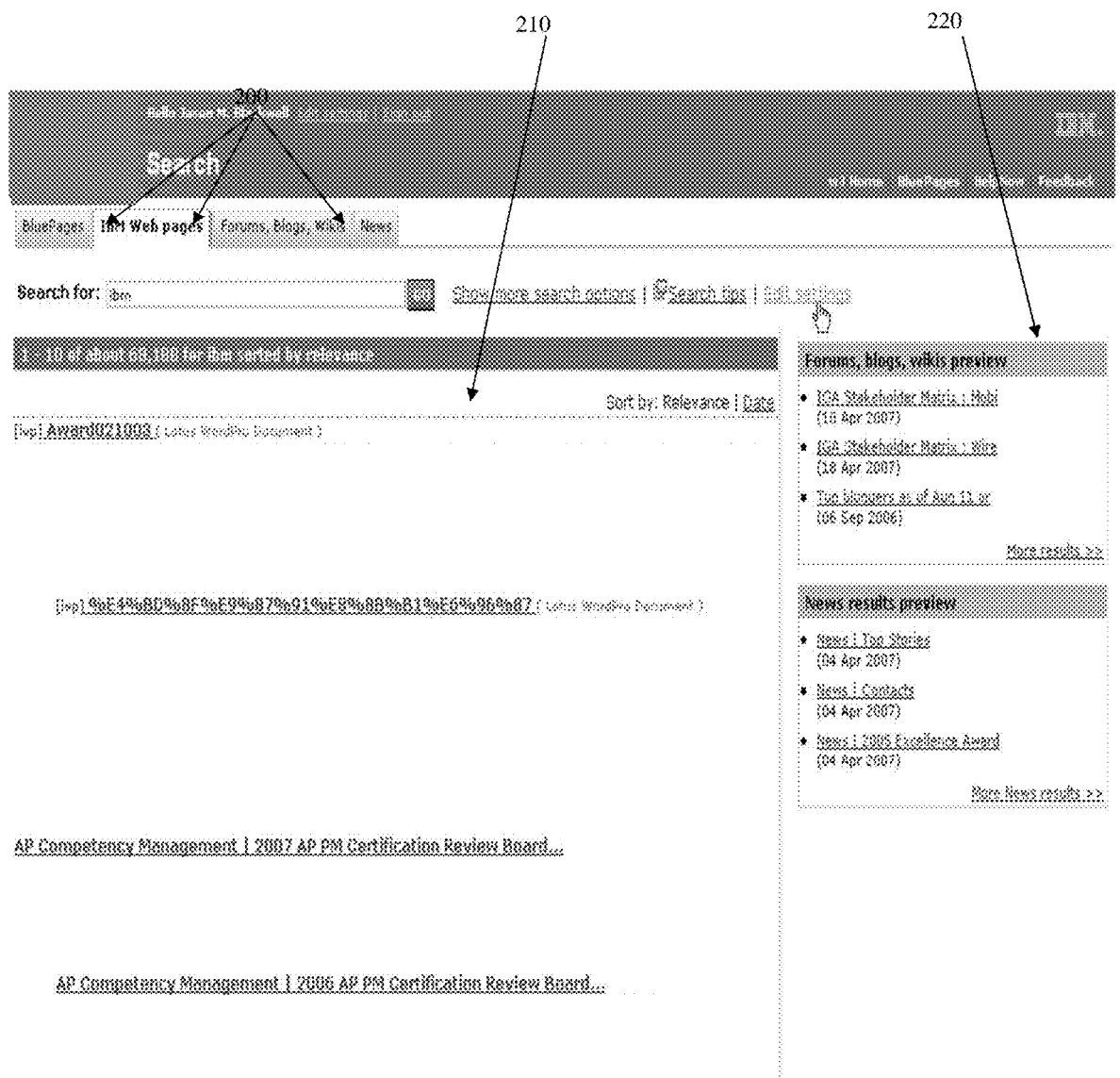

As shown in FIG. 2c, in embodiments, the user interface is configured to dedicate a portion of the interface to display the preview results as a sidebar. In the current implementation, a right-hand column is dedicated to providing the sidebar of previews. However, other placements are also contemplated by the invention (e.g., top, bottom, and left). The right side is recommended (at least for western cultures), as it is non-disruptive to the core search results, while still being clearly displayed. This space would be reserved for this function on all searches, unless the user makes customization changes, as described in detail below.

In further embodiments, the preview list 220 may be provided with a visual cue such as, for example, colored title bars with the intent to ensure that the panes are clearly labeled, grouped, and readily distinguished from one another. Also, as should be understood by those of skill in the art, the titles generally match the preview result collection, with the results varying somewhat based upon the collection that is searched.

The user interface includes user customization controls for customizing the previews. In one contemplated implementation, the interface includes a link 230 (e.g., "edit settings"' link) on the search results page in order to gain access to the customization controls. (See, FIGS. 2a and 2c.) However, those of skill in the art should understand that the customization controls could also be placed directly on the preview panes or in many other locations on the display.

Figure 3:
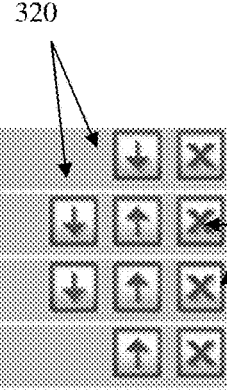
FIG. 3 shows controls for customizing preview search results in accordance with an aspect of the invention.

FIG. 3 shows controls for customizing the preview search results. The controls of FIG. 3 may be implemented in any combination for any search, as designed by a search developer. More specifically, in one contemplated implementation, the controls 300 include a number of preferences providing, but not limited to, the following abilities:

Remove or show the dedicated screen space for previews by selecting "show sidebar" 310.

Position each preview pane in a certain sequence by selecting the respective up and down arrows 320.

Remove panes by selecting the "X" button 330.

Add panes by selecting the "Add sidebar module . . . " button 340. (The "Add sidebar module . . . " button 340 is disabled when no other panes are available to be added.)

Also, although the current implementation includes the above controls, an AJAX implementation where the user drags and drops the panes to a desired location is also contemplated by the present invention. AJAX could also enable asynchronous loading of the preview panes (relative to the main search results). AJAX (Asynchronous JavaScript and XML) is a development technique for creating interactive web applications. The intent is to make web pages feel more responsive by exchanging small amounts of data with the server behind the scenes, so that the entire web page does not have to be reloaded each time the user requests a change. This is intended to increase the web page's interactivity, speed, and usability. The above options can be easily implemented using common HTML and CSS coding techniques.

In addition to providing previews for other collections, the system and method of the invention also accommodates "specialized" searches. For example, the w3 Search (or other integrated search engines) can offer results from "bookmarked" pages. This type of collection search is a special focused search that provides high-quality results (e.g., since these pages have been judged worthy enough by others to be bookmarked). In addition, as discussed in more detail below, the "specialized" search can be expanded by enabling users to define their own preview collections (e.g., indicating preview results from a certain site).

Illustrative Example

Figure 4A:
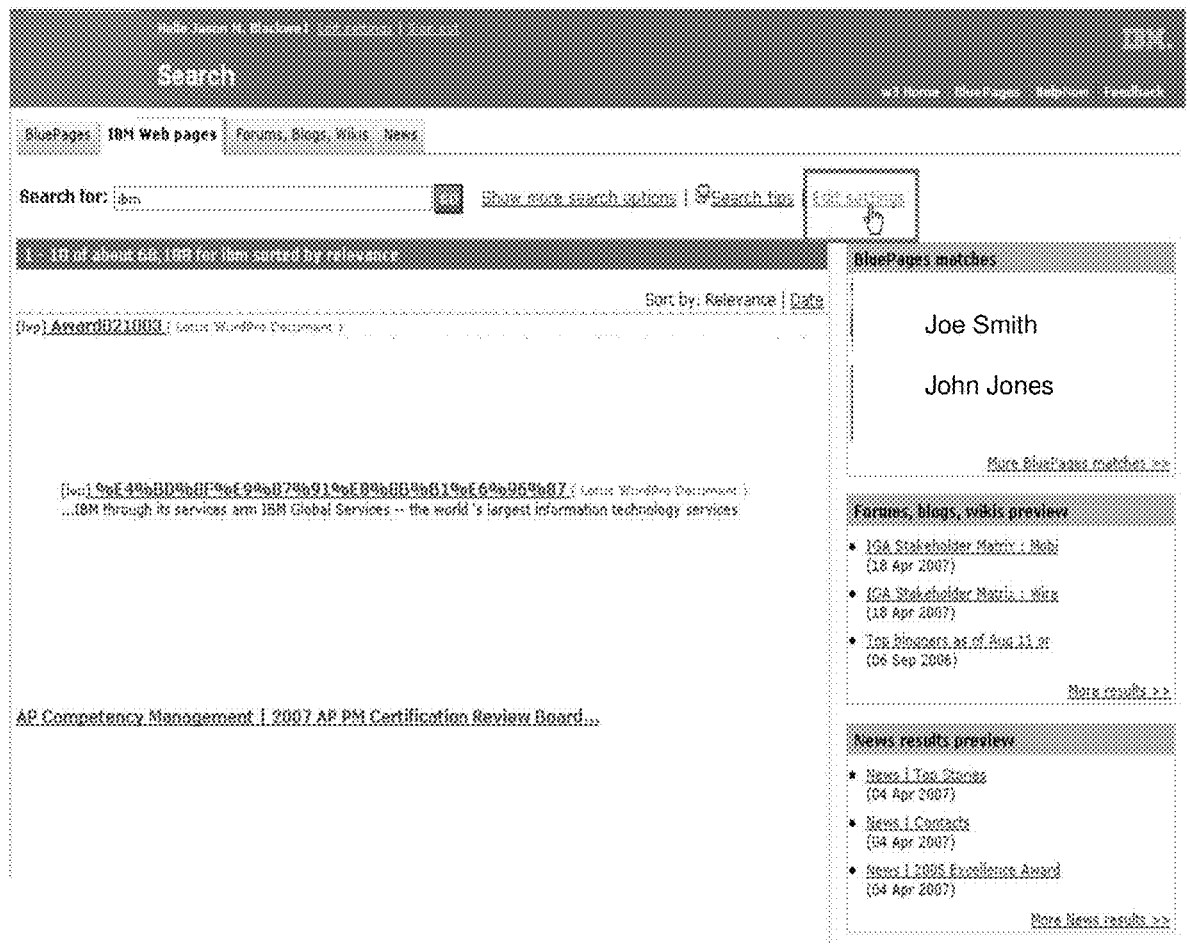
FIGS. 4a-4s are graphical interfaces showing examples of implementing aspects of the invention.
Figure 4B:
Figure 4C:
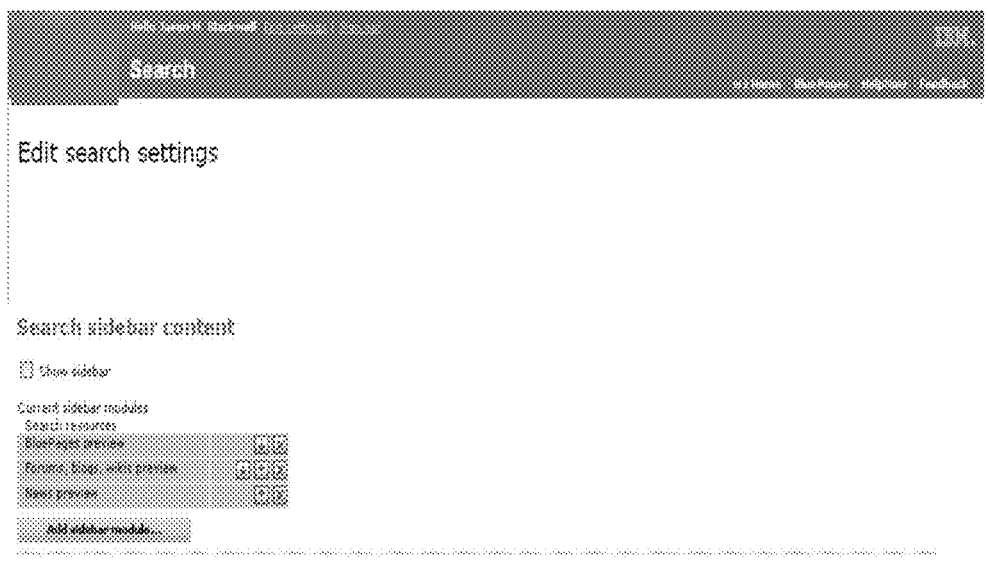
Figure 4D:
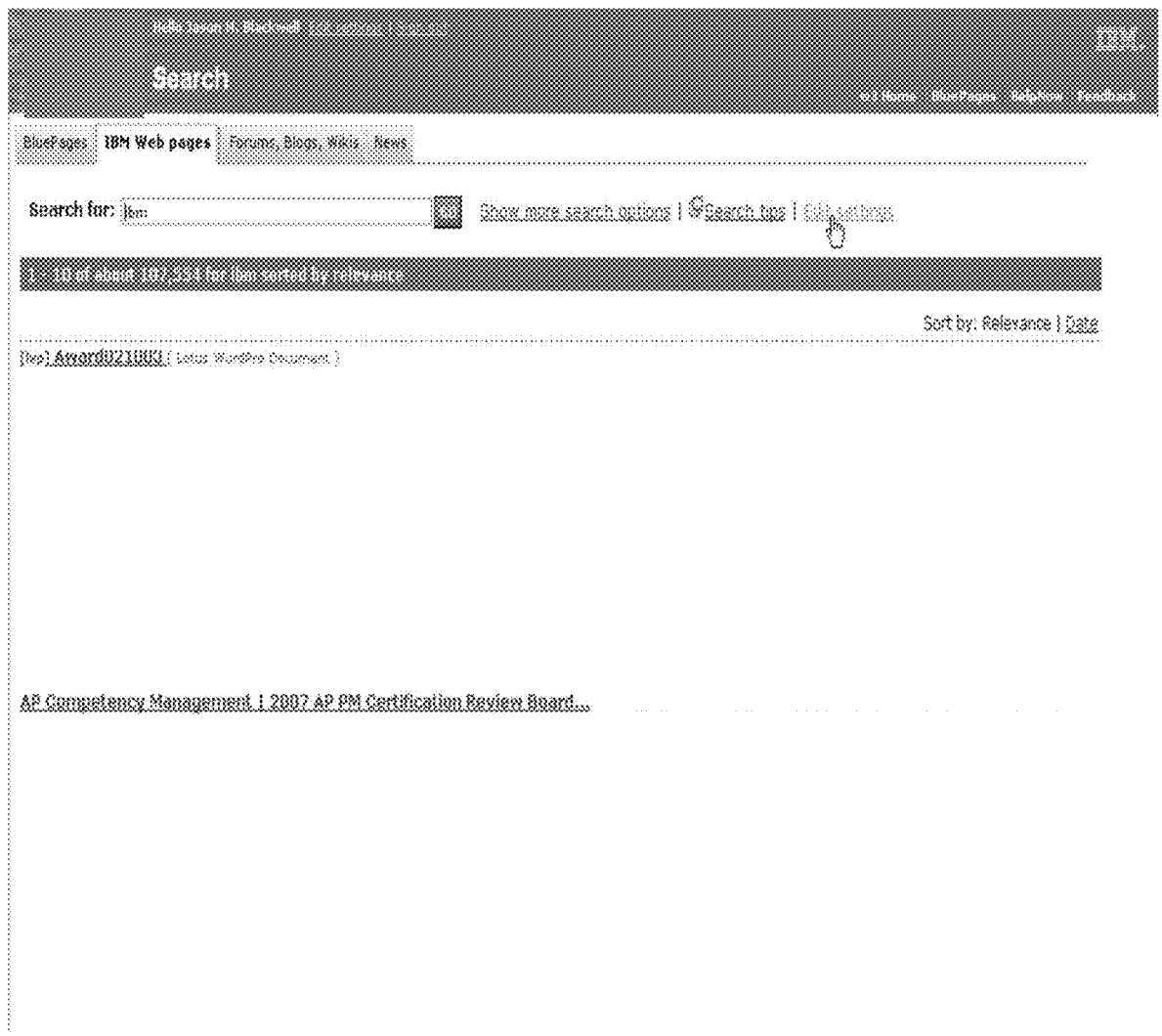
Figure 4E:
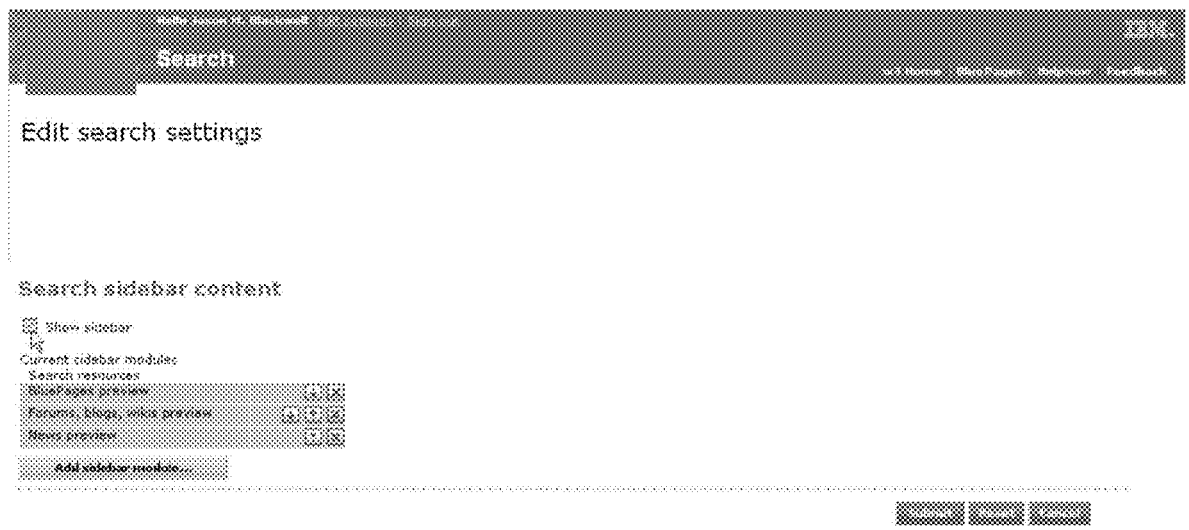
Figure 4F:
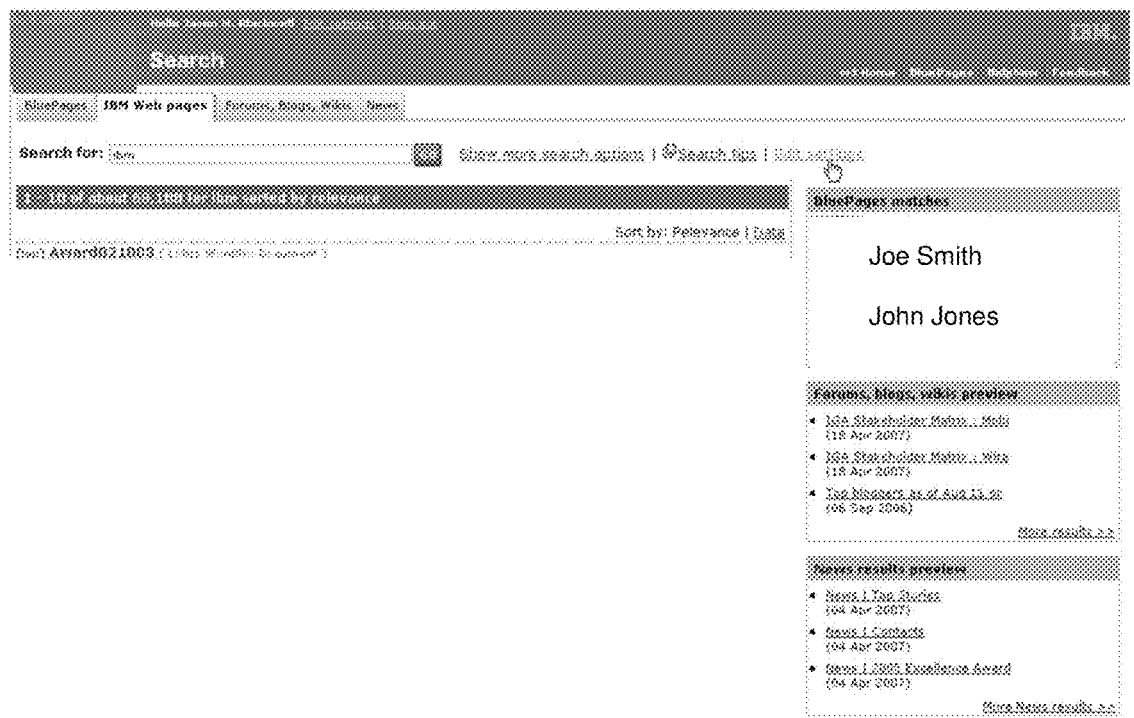
Figure 4G:
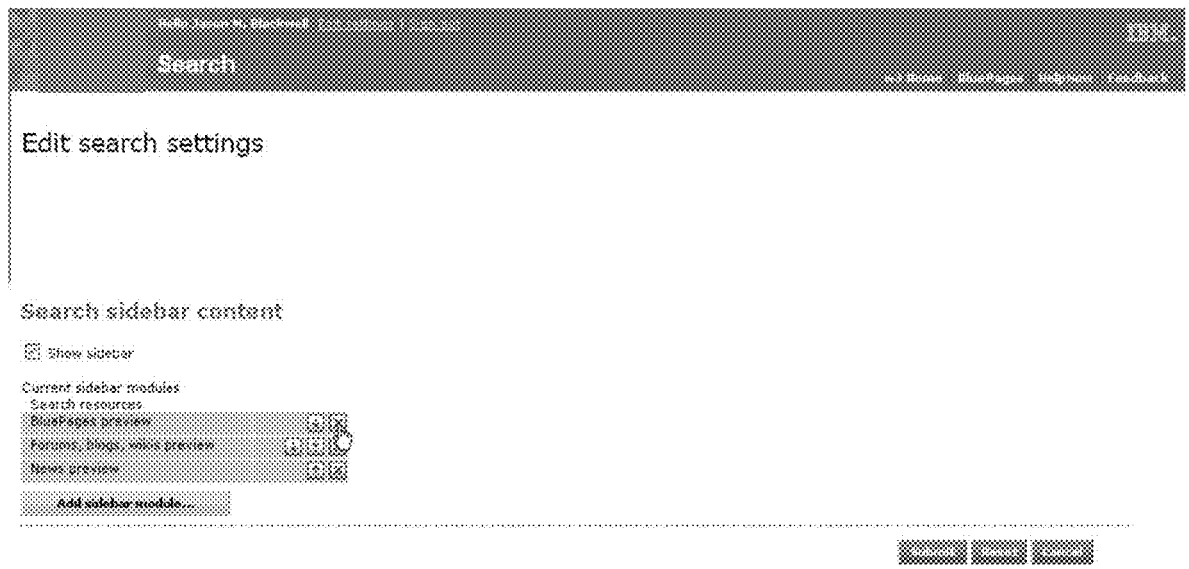
Figure 4H:
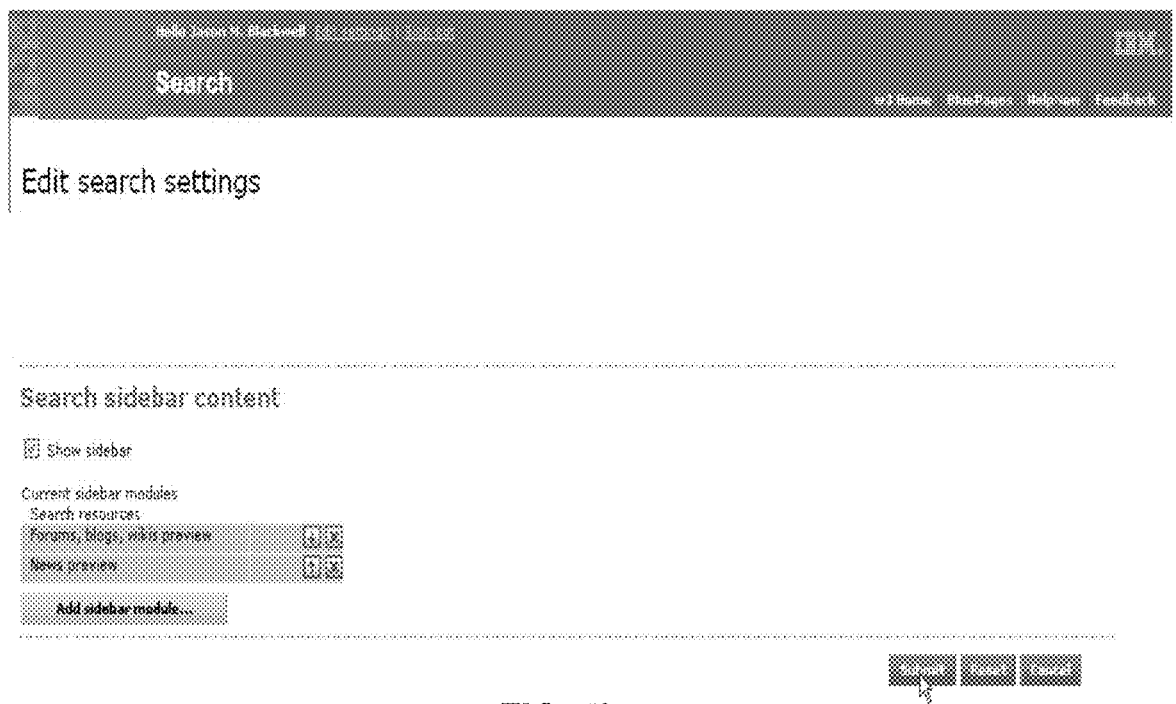
Figure 4I:
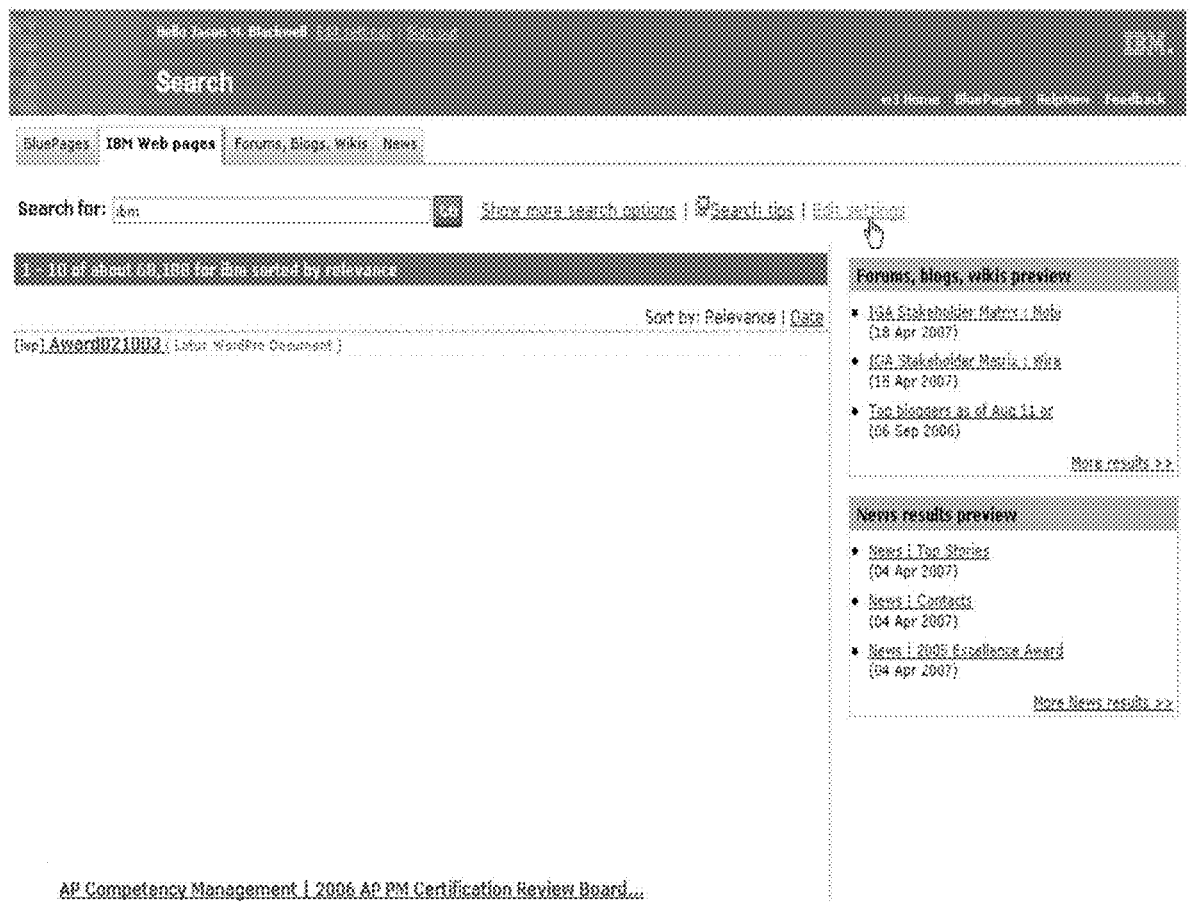
Figure 4J:
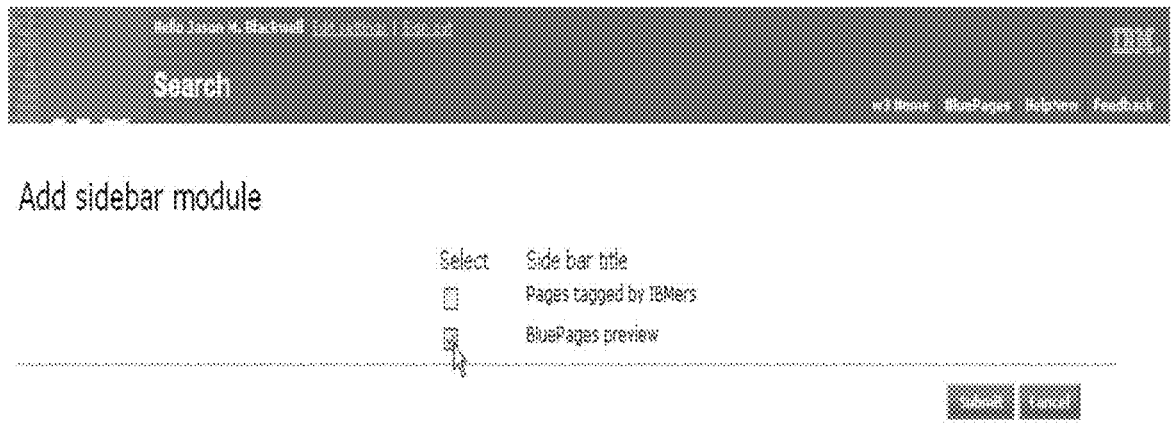
Figure 4K:
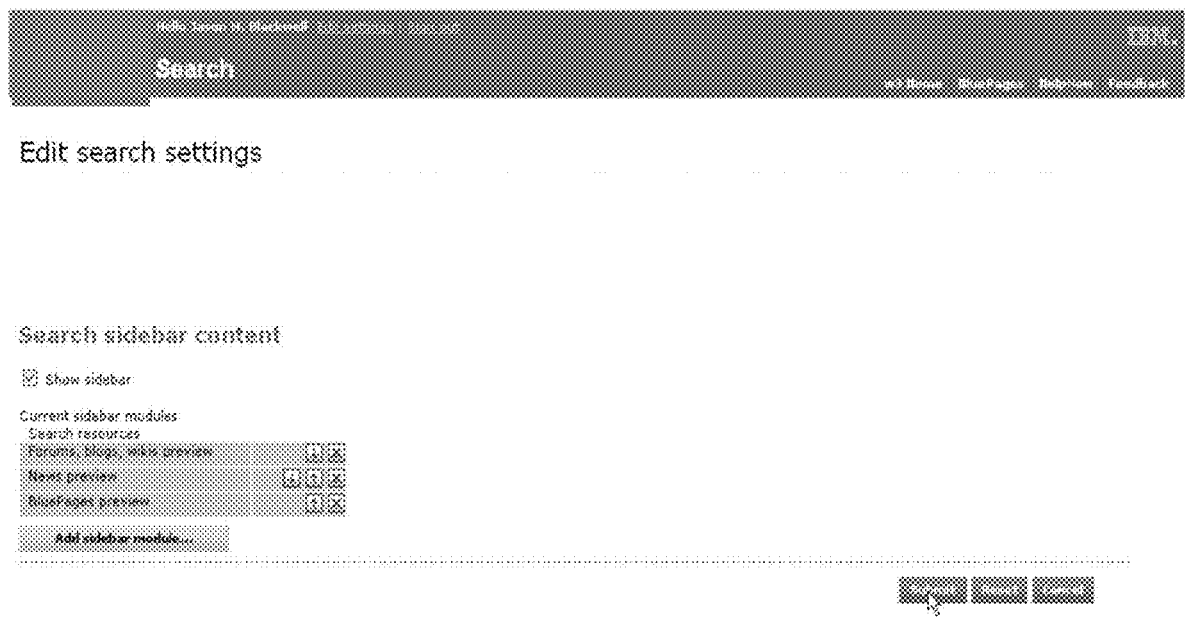
Figure 4I:
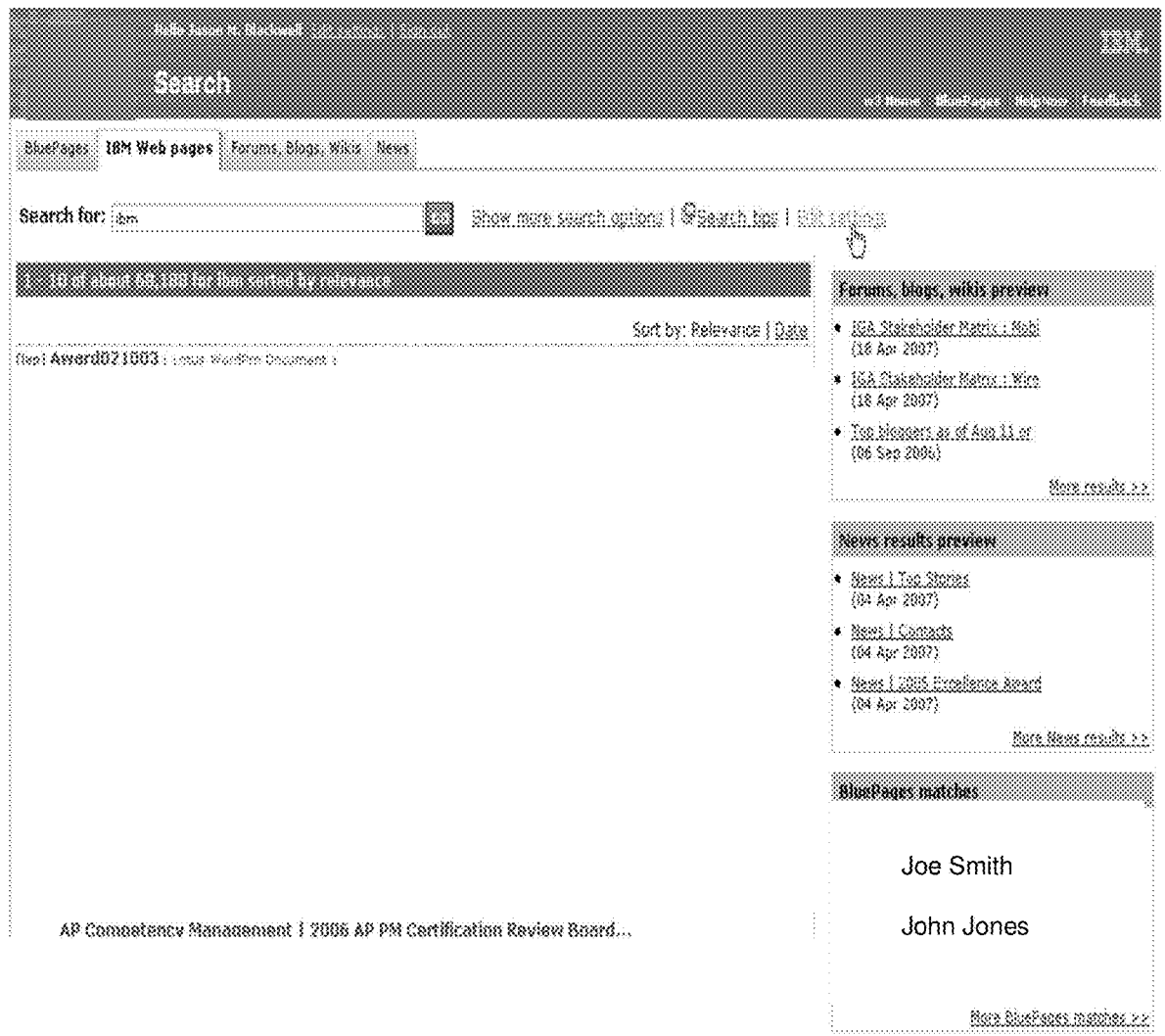
Figure 4M:
Figure 4N:
Figure 4O:
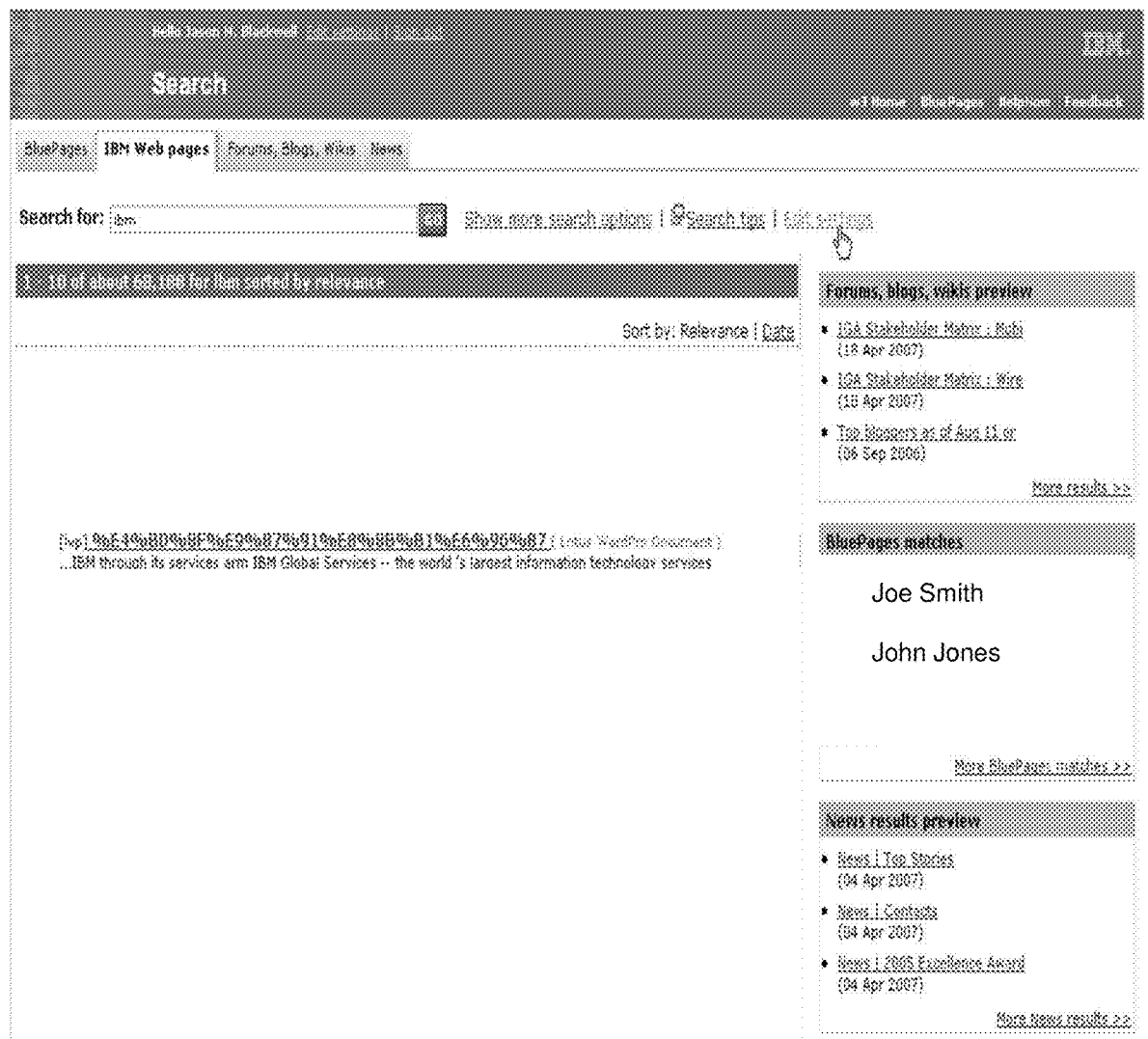
Figure 4P:
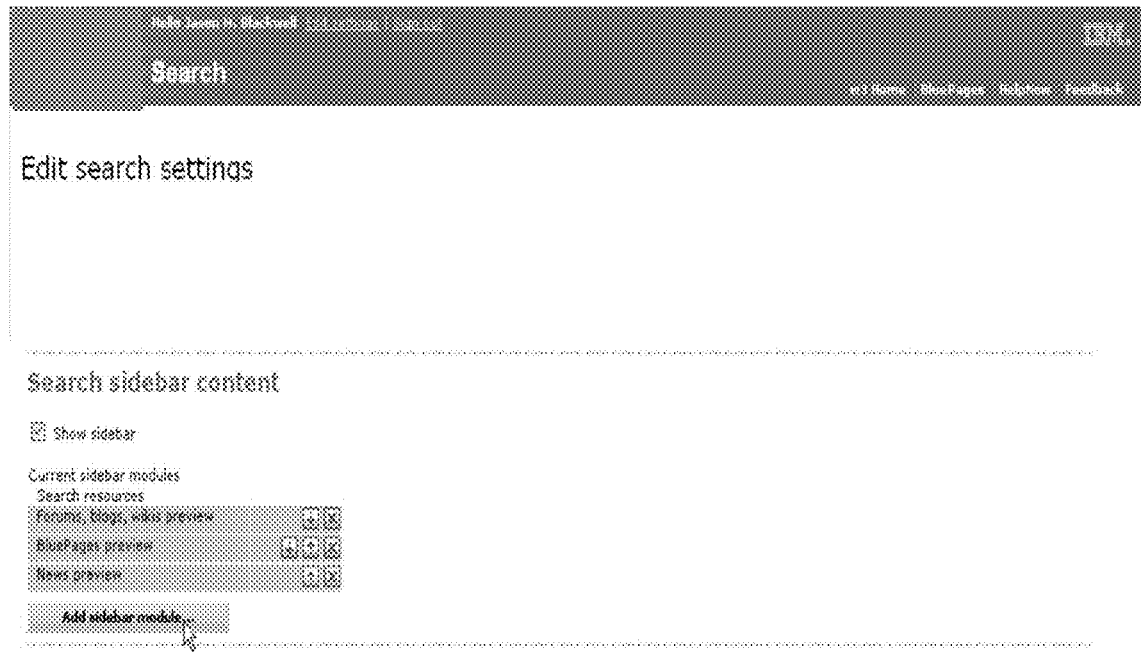
Figure 4Q:
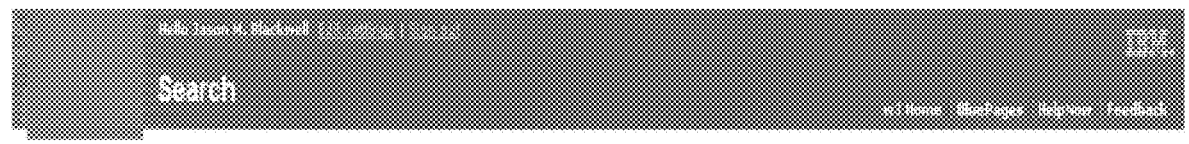
Figure 4R:
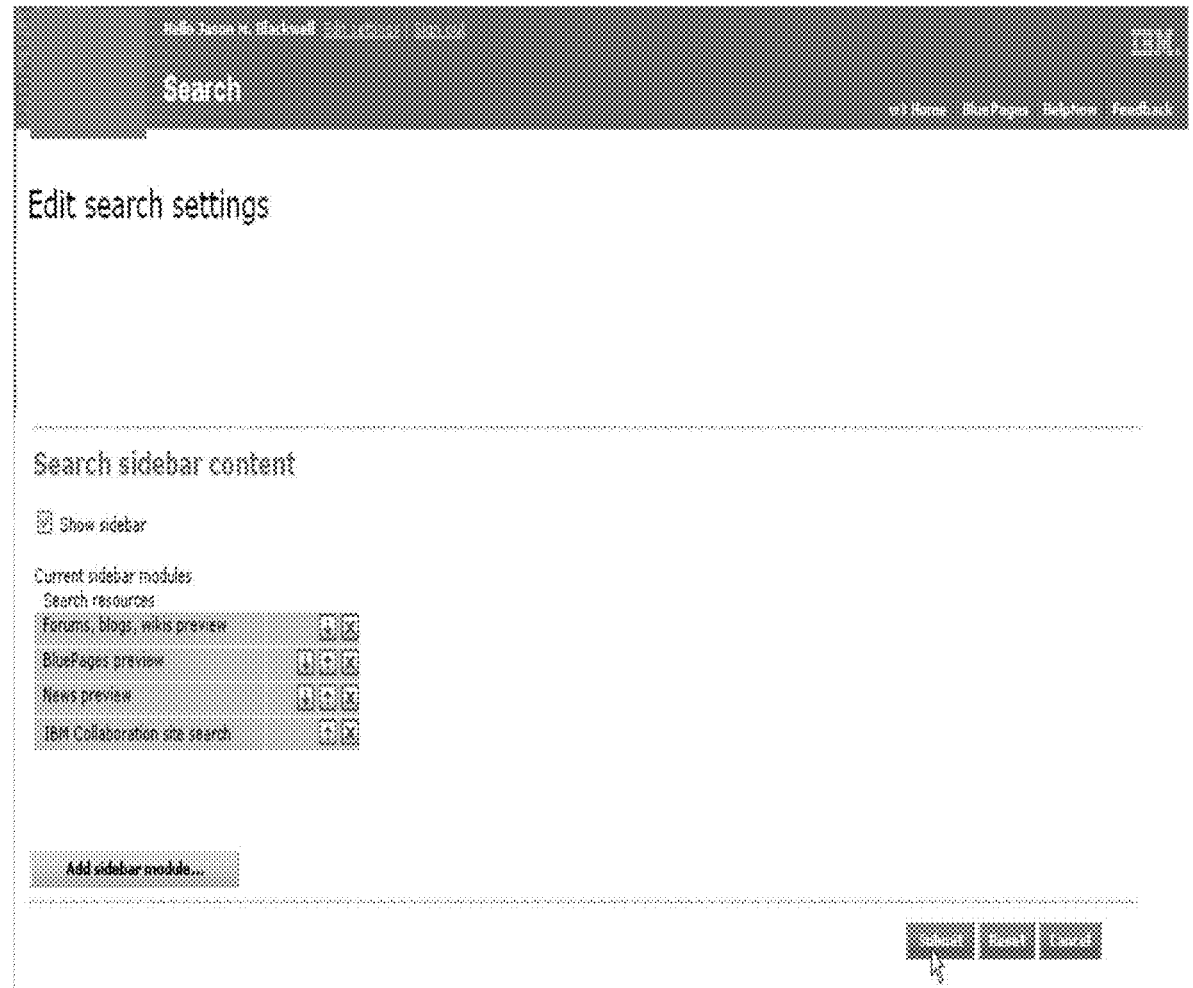
Figure 4S:

FIGS. 4a-4s are illustrative examples implementing processes of the invention, which may be implemented in the environment of FIG. 1. The processes of FIGS. 4a-4s may be implemented and executed from either a server, in a client server relationship, or they may run on a user workstation. Additionally, the invention can be implemented in an entirely hardware embodiment, an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system, as discussed above.

In FIG. 4a, the user has performed a search on "IBM". In this example, the user decides to customize the sidebar (e.g., delete sidebar). To do so, the user selects the edit settings link. After selecting the edit settings, the user is taken to the edit settings page of FIG. 4b. Here, the user unchecked the "Show sidebar" option. Next, the user selects Submit in FIG. 4c. As shown in FIG. 4d, the preview side bar has now been deleted.

Still referring to FIG. 4d, the user now decides to bring the sidebar back. To do so, the user again selects the edit settings. The edit settings page opens (FIG. 4e). The user checks "Show sidebar" and clicks submit. As shown in FIG. 4f, the sidebar is back on the results page.

Still referring to FIG. 4f, the user decides to remove the "BluePages" preview. To do so, the user selects the edit settings of FIG. 4f. The edit settings page opens as shown in FIG. 4g. The user selects the "X" button on the BluePages preview row. The BluePages row disappears from the table as shown in FIG. 4h, and the user now selects "Submit". As shown in FIG. 4i, the BluePages preview has now been removed from the results page.

Still referring to FIG. 4i, the user decides to add the BluePages preview, and accordingly selects the edit settings. As shown in FIG. 4j, the user selects the "BluePages" preview checkbox and then clicks "Submit". This page may also include a free form text box to select a user-defined category, as discussed below. As shown by FIG. 4k, the user is taken back to the edit settings screen, where BluePages now appears as a row in the table. The user can simply select "Submit", which show the results screen of FIG. 4l, now showing that the BluePages module has been added.

Still referring to FIG. 4l, the user decides to relocate or move the BluePages item as the second listed item. To do so, the user selects the edit settings. As shown in FIG. 4m, the edit settings page opens and the user selects the "up arrow" button. After selecting the up arrow, the table of FIG. 4n shows Bluepages™ as the second item in the list. The user then selects the "Submit" button. The results page displays, with BluePages now as the second item in the list (FIG. 4o).

Next, the user decides to add a module that previews results from one of the user's favorite sites, e.g., the IBM Collaboration site. The user selects the edit settings at which time the edit settings page of FIG. 4p is displayed. The user selects the "Add sidebar module . . . ", which opens the add page of FIG. 4q. The user selects the option for a site search, types in the name of the site, the URL of the site, and submits. The text box can be fully text editable thus allowing the user to define many different types of collections. As shown in FIG. 4r, the IBM collaboration site now appears as a row in the table. The user submits this request, which appears on the results page of FIG. 4s.

Thus, in embodiments, the invention can be a system having at least one of a hardware component and a software component. The hardware component and the software component are each operable of providing a listing of search results for a first requested collection and a customizable preview listing of search results for at least a second requested collection. The preview listing is a subset of a full listing of search results for the at least second requested collection. The hardware component and the software component is maintained by a service provider and the search results for the first requested collection and the customizable preview listing of the search results for the at least the second requested collection is provided to a user based on advertisement revenue. The search results for the first requested collection and the customizable preview listing of the search results are search results provided from a searchable database on the World Wide Web.

While the invention has been described in terms of embodiments, those skilled in the art will recognize that the invention can be practiced with modifications and in the spirit and scope of the appended claims.

What is claimed is:

1. A method comprising:
   providing search results in a first dedicated screen space of a user interface and associated with a first collection based on at least one search term;
   providing a separate customizable preview of search results based on the at least one search term in a separate pane located in a second dedicated screen space of the user interface and associated with at least one second collection which is different from the first collection; and
   providing options to a user to customize the second dedicated screen space and the separate pane through an editing settings link in the user interface that is configured to provide customization controls which:
      allow the user to remove the separate pane in the second dedicated screen space;
      order the separate pane with at least one other customizable preview pane in the second dedicated screen space; and
      allow the user to add another pane in the second dedicated screen space which includes the at least one second collection to be any web site that the user inputs through a text editable box in an add sidebar module,
   wherein the options presented to the user for customizing the second dedicated screen space and the separate pane further include using the editing settings link to remove a sidebar within the second dedicated screen space.

2. The method of claim 1, wherein the customizable preview of search results is a subset of a search result for the at least one second collection by providing no more than three search results.

3. The method of claim 1, wherein the customizable preview of search results is expandable to a full search result for the at least one second collection by selecting a hyperlink associated with the at least one second collection.

4. The method of claim 1, wherein the customizable preview of search results includes user-defined collections.

5. The method of claim 1, wherein the at least second collection is at least two or more collections each of which are preexisting collections for a search engine searching for results on the World Wide Web.

6. The method of claim 1, wherein the at least one second collection is a predefined searchable collection on the World Wide Web.

7. The method of claim 1, wherein the customizable preview of search results is displayed on a side of a same graphical interface as the search results.

8. The method of claim 1, wherein the options presented to the user for customizing the second dedicated screen space and the separate pane further include using the editing settings link to modify content of the separate pane by selecting or deselecting association of any one of a plurality of collections with the separate pane different from the first collection.

9. The method of claim 1, wherein the options presented to the user for customizing the second dedicated screen space and the separate pane further include using the editing settings link to:
   provide for the at least one other customizable preview pane within the second dedicated screen space;
   modify content of the at least one other customizable preview pane by selecting or deselecting association of at least one third collection with the at least one other customizable preview pane; and
   position each preview pane in a certain sequence within the second dedicated screen space.

10. The method of claim 1, wherein the customizable preview of search results includes at least one search result for the at least one second collection.

11. The method of claim 1, wherein the customizable preview of search results is obtained from a searchable database.

12. The method of claim 1, wherein the customizable preview of search results includes providing hyperlinks to individual searchable results in the customizable preview of search results.

13. The method of claim 1, wherein the customizable preview of search results includes providing hyperlinks to the at least one second collection.

14. A method comprising:
   providing search results in a first dedicated screen space of a user interface and associated with a first collection based on at least one search term;
   providing a separate customizable preview of search results based on the at least one search term in a separate pane located in a second dedicated screen space of the user interface and associated with at least one second collection which is different from the first collection; and
   providing options to a user to customize the second dedicated screen space and the separate pane through an editing settings link in the user interface that is configured to provide customization controls which:
      allow the user to remove the separate pane in the second dedicated screen space;
      order the separate pane with at least one other customizable preview pane in the second dedicated screen space; and
   allow the user to add another pane in the second dedicated screen space which includes the at least one second collection to be any web site that the user inputs through a text editable box in an add sidebar module,
   wherein the options presented to the user for customizing the second dedicated screen space and the separate pane further include using the editing settings link to relocate a sidebar within the second dedicated screen space.

* * * * *